UNITED STATES PATENT OFFICE.

HENRY S. GORDON, OF STEEL'S MILLS, ILLINOIS.

IMPROVEMENT IN HARVESTERS.

Specification forming part of Letters Patent No. 132,003, dated October 8, 1872.

*To all whom it may concern:*

Be it known that I, HENRY S. GORDON, of Steel's Mills, in the county of Randolph and State of Illinois, have invented a new and Improved Reaper; and I do hereby declare that the following is a full, clear, and exact description of the same, reference being had to the annexed drawing making a part of this specification, in which—

Figure 1:
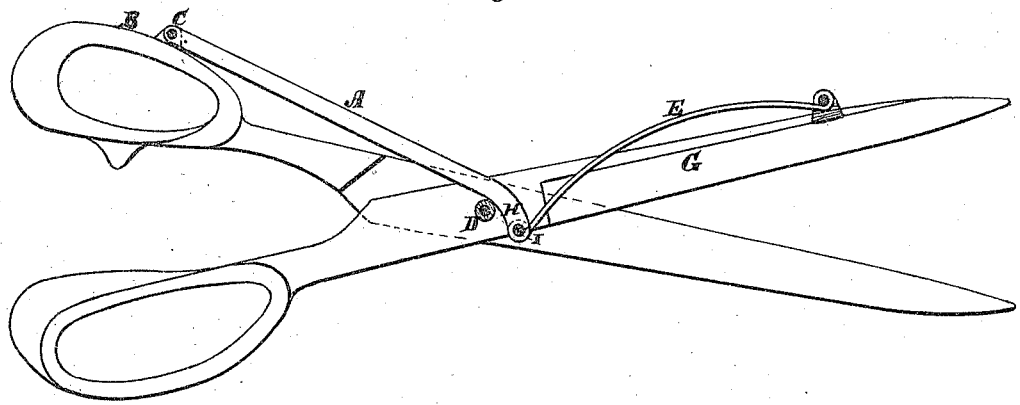
Figure 2:
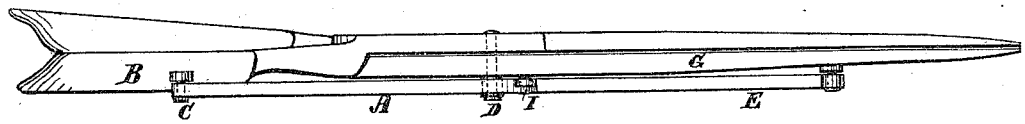

Figure 1, Sheet I, is a perspective view; Fig. 2, Sheet II, is a front elevation; and Fig. 3, Sheet II, is a plan view of a machine embodying my invention.

Similar letters of reference indicate like parts.

The nature of my invention relates to a machine for reaping grain in which the cutters are given a rotary motion communicated to them and to each other by means of gearing; also a device for raking the grain as it falls from the cutters or sickles, and depositing it on a suitable platform, whence it is lifted, bound, and thrown from the reaper. It consists, first, in providing the front of my reaper with a series of toothed disks, the teeth themselves being finely serrated, similar to an ordinary sickle, the said disks revolving horizontally between fingers projecting from the front. It consists, also, of an endless apron moving with its upper periphery nearly on a plane with the cutters, and being provided with flexible arms which carry the cut grain to one side of the reaper, depositing it on a platform, as above mentioned. It further consists in the arrangement of a raking-in reel, which receives an elliptical motion for the purpose of raking or holding the grain onto the cutters as the machine moves forward.

Among the advantages I claim for my improvements are, ease of operation, lightness of draft of the reaper, steadiness of motion secured by the nature of all the working parts moving in circular lines, and, therefore, not subject to the objections of a rapid reciprocating motion, where the inertia of these parts greatly taxes the strength of a reaper, and makes it very heavy of draft.

The construction of my invention is as follows: A A is the frame, carried by two driving-wheels, B B', which are attached to axle C. A toothed wheel, D, is permanently fastened to the outer face of wheel B', carrying an endless chain, E, which passes between a second toothed wheel, F, and rubber roller G, and finally around a third toothed wheel, H, fastened to the shaft I. To the small upright shaft carrying the wheel F is attached a gear-wheel which gives motion to disks 1, 2, 3, 4, and 5, by the intervention of the idlers 1', 2', 3', and 4'. At J J are fingers pointed and so arranged as to resist the grain while being cut by the revolving toothed disks 1, 2, 3, &c.

The raking apparatus is constructed as follows: An endless apron, K, passes over rollers L L'. The latter has formed on one end a grooved pulley to receive a round belt, M, passing over friction-rollers N N', and around the driving-pulley O on the axle C, from which the endless apron receives its motion. To the outside of the apron is attached a series of arms, $a\ a\ a$, jointed so as to flex when brought in contact with the guard P, but assuming an upright position when brought to the top, as seen in Fig. 2. This erect position is given the arms by coiled springs, and stopped at right angle with the apron by a stop on the joint forming a knuckle-joint. The reel Q, which terminates at the front in a toothed plate, R, extends back, where it is provided with two rigid arms, S S', extending to the cranks T T', and being held in position by the two flexible arms U U'. Motion to the cranks T T' is imparted by the chain E, as above described. The end of the reel (consisting of the plate R) receives a rotary motion. The machine is further provided with the tongue $b$, seat $c$, and a third wheel, $d$, as in ordinary cases.

In operation my invention is as follows: As the machine moves forward the cutters 1, 2, 3, 4, and 5 receive a rapid rotary motion in the direction indicated by the arrows shown in Fig. 3. The plate R of reel Q draws the grain toward the machine by the motion above described. As the grain is cut it falls with the head back between the erect arms $a\ a$ and across the endless apron, which, as it moves, carries the grain to the platform V, where it accumulates and is removed by the binders.

Having thus described my invention, what

C. GUDEHUS.

Improvement in Shears.

No. 132,004.  Patented Oct. 8, 1872.

Witnesses:

Inventor: